(12) United States Patent
Greeff et al.

(10) Patent No.: US 7,889,083 B2
(45) Date of Patent: Feb. 15, 2011

(54) RFID DEVICE TIME SYNCHRONIZATION FROM A PUBLIC SOURCE

(75) Inventors: Roy Edgar Greeff, Boise, ID (US); Freddie W. Smith, Boise, ID (US); David K. Ovard, Meridan, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 372 days.

(21) Appl. No.: 11/942,353

(22) Filed: Nov. 19, 2007

(65) Prior Publication Data

US 2009/0128292 A1    May 21, 2009

(51) Int. Cl.
G08B 13/14    (2006.01)

(52) U.S. Cl. .................... 340/572.4; 340/572.1

(58) Field of Classification Search .......... 340/572.1, 340/572.4, 572.7, 572.8, 539.1, 539.11, 10.1; 342/357.09, 357.1, 386; 701/213, 214; 236/46 R; 165/238
See application file for complete search history.

(56) References Cited

U.S. PATENT DOCUMENTS

| | | | |
|---|---|---|---|
| 5,365,516 A | * | 11/1994 | Jandrell ................ 370/335 |
| 6,783,079 B2 | * | 8/2004 | Carey et al. ............ 236/46 R |
| 6,814,299 B1 | * | 11/2004 | Carey .................... 236/46 R |
| 7,307,594 B2 | * | 12/2007 | Noguchi ................. 343/718 |
| 7,626,544 B2 | * | 12/2009 | Smith et al. ............. 342/386 |
| 2008/0030330 A1 | * | 2/2008 | Vock et al. ............. 340/568.1 |
| 2009/0109041 A1 | | 4/2009 | Greeff |

OTHER PUBLICATIONS

USPTO Transaction History of U.S. Appl. No. 11/924,799, filed Oct. 26, 2007, entitled "RFID Label Time Synchronization."
Greeff, Roy, U.S. Appl. No. 11/924,799; "RFID Device Time Synchronization From A Public Source", filed Oct. 26, 2007.
USPTO Transaction History of related U.S. Appl. No. 11/924,799, filed Oct. 26, 2007, entitled "RFID Label Time Synchronization."

* cited by examiner

Primary Examiner—Van T. Trieu

(57) ABSTRACT

A radio frequency identification (RFID) device includes an antenna linked to a receiving circuit, the antenna tuned to receive a radio frequency (RF) time-code signal from a public source, a controller circuit and an internal clock linked to the receiving circuit, a microcontroller linked to the receiving circuit, a memory linked to the microcontroller, and a battery linked to and powering the receiving circuit, controller circuit, internal clock, microcontroller and memory.

17 Claims, 4 Drawing Sheets

RFID DEVICE TIME SYNCHRONIZATION FROM A PUBLIC SOURCE

BACKGROUND

The present invention relates to radio frequency identification devices, and more particularly to RFID device time synchronization from a public source.

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF (radio frequency) portion of the electromagnetic spectrum is used to transmit signals. A typical RFID system includes an antenna and a transceiver, which reads the radio frequency and transfers the information to a processing device (reader) and a device, or RF device, which contains the RF circuitry and information to be transmitted. The antenna enables the integrated circuit to transmit its information to the reader that converts the radio waves reflected back from the RFID device into digital information that can then be passed on to computers that can analyze the data.

SUMMARY

The present invention provides methods and apparatus for RFID device time synchronization from a public source.

DETAILED DESCRIPTION

Radio frequency identification (RFID) is a technology that incorporates the use of electromagnetic or electrostatic coupling in the radio frequency (RF) portion of the electromagnetic spectrum to uniquely identify an object, animal, or person.

RFID devices can be intelligent or just respond with a simple identification (ID) to radio frequency (RF) interrogations. The RFID device can contain memory. This memory can be loaded with data either via an interrogator, or directly by some integrated data gathering element of the device, for example, an environmental sensor. This data is retrieved some time later.

Figure 1:
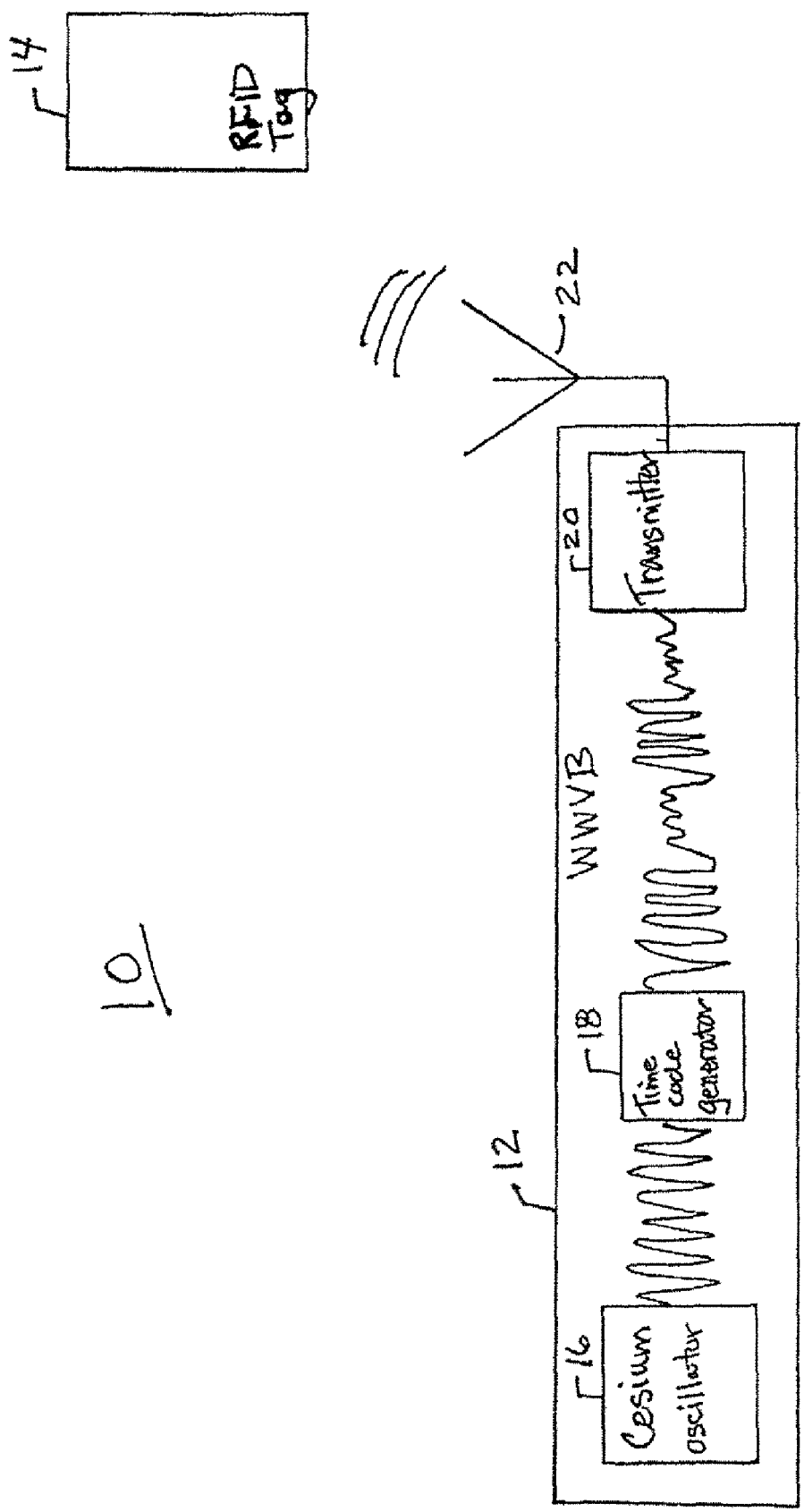
FIG. 1 is a block diagram of an exemplary network.

As shown in FIG. 1, an exemplary network 10 includes a National institute of Standards and Technology (NIST) radio station WWVB 12 and an exemplary RFID device 14. In this network 10, a 66 kHz carrier frequency is locked to the output of a cesium oscillator 16 whose frequency is steered to agree with a national standard. A time code generator 18 synchronized to Universal Coordinated Time (UTC) modulates the signal once per second by dropping the carrier power 10 dB (90%). Once the signal leaves the time code generator 18, it is sent to a transmitter 20, which amplifies the signal and broadcasts it using a large antenna array 22.

Figure 2:
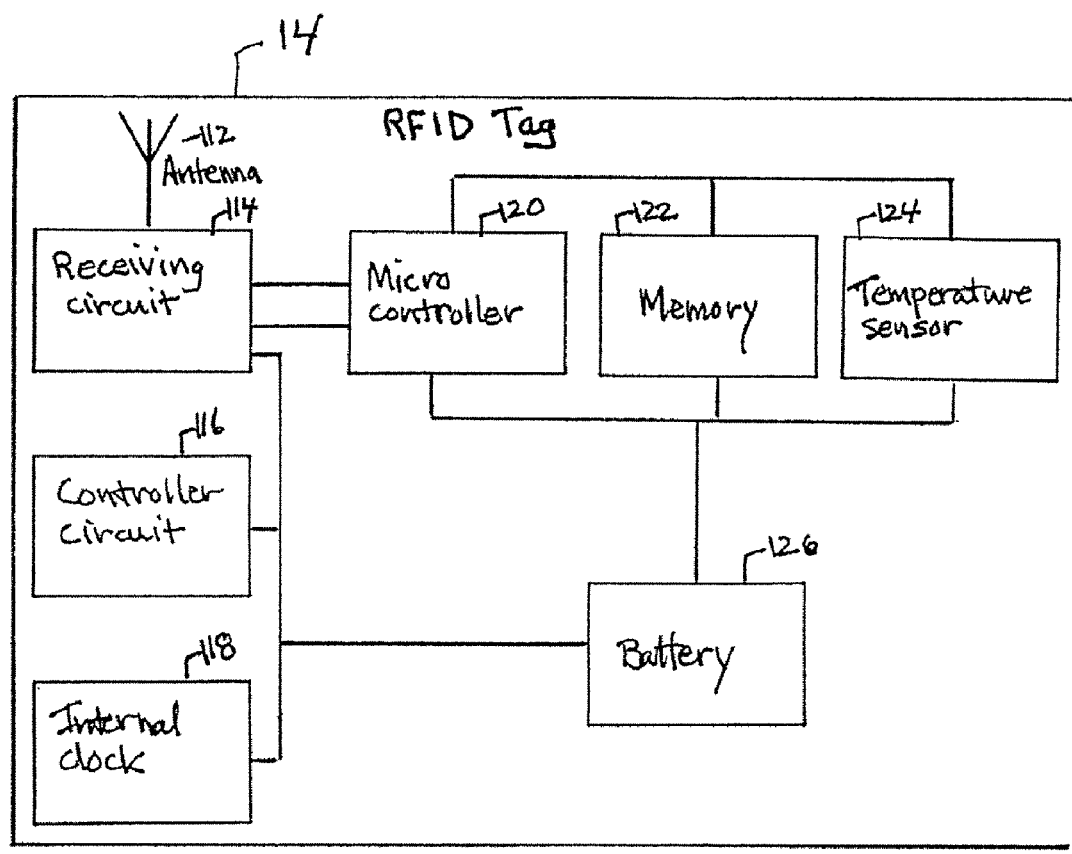
FIG. 2 is a block diagram of an exemplary RFID device.

As shown in FIG. 2, the exemplary RFID device 14 includes an antenna 112, receiving circuit 114, controller circuit 116, internal clock 118, microcontroller 120, memory 122, temperature sensor 124 and battery 126. In this example, temperature sensor 124 senses and transmits temperature data to memory 122 at user-selectable intervals of time. When triggered by RF interrogation, microcontroller 120 fetches the data (i.e., time stamp and temperature) from memory 122 and sends it out to an interrogator as multiplexed data packets. In this manner, a historical temperature log stored in memory 122 in the RFID device 14 can be retrieved. Temperature logging is limited by the size of memory 122 and/or life of battery 126. In other examples, the temperature sensor 124 is replaced by other sensing devices, such as a pressure sensor, humidity sensor, and so forth.

In this example, the antenna 112 is tuned to receive a RF time-code signal from the NIST radio station WWVB 12. The receiving circuit 114 linked to the antenna 112 converts the received RF time-code signal into a digital time code. The controller circuit 116 decodes the time-code bit stream(s) and sends the decoded time-code bit stream to the internal clock 118.

When the RFID device 14 is initialized, the RFID device 14 and an interrogator have identical times since the interrogator downloads its time to the RFID device 14. However, over a period of service, the time maintained in the RFID device 14 can drift from the actual time maintained in the interrogator. During the period of service, the RFID device 14 continues to receive RF time-code signals from NIST radio station WWVB 12 that its controller circuit 116 decodes and sends to the RFID device's internal clock 118, thus maintaining an accurate time within the RFID device 14.

More generally, the antenna 112 can tuned to receive a RF time-code signal from a variety of public sources. For example, United States National Institute of Standards and Technology (NIST) Broadcasts can be used, as described above. German time signal broadcasts, such as the time signal from DCF77, can be used. Canadian, United Kingdom, Japanese, Chinese, Swiss and French time signal broadcasts can be used.

More specifically, the antenna 112 is tuned to receive and decode a low frequency radio signal that is coded with precise time information. In this particular example, the National Institute of Standards and Technology (NIST) operates and maintains a radio station under the call letters WWVB near Fort Collins, Colo. Radio station WWVB transmits a low frequency radio signal that contains precise time information. The frequency of the radio signal is 60 KHz, well below the lowest frequency available on the standard AM radio broadcast band, i.e., 530 KHz. This radio signal includes digital bits that are generated by raising and lowering the transmitted power of the signal once every second. It takes about one minute to transmit a time code including the one-second bits.

This time signal transmitted by NIST radio station WWVB 12 forms the standard for time in the United States and in other North American countries. It is utilized as the time standard by radio and television broadcast networks, by many entities on the Internet, and wherever else accurate time is needed or desired.

The receiving circuit 114 decodes the WWVB time signal and synchronizes the current time contained in the signal in the internal clock 118. The internal clock 118 can include appropriate hourly adjustments to compensate for differences of time between the different time zones, and for Daylight Savings Time (DST), such that an accurate time is incorporated each time zone where the RFID device 14 is used.

In this example, the antenna 112 is tuned to the 60 KHz frequency of radio station WWVB. Reception of the radio signal can be affected by many factors such as electromagnetic interference and the position of the antenna 112 inside the RFID device 14 with respect to the WWVB transmitter at Fort Collins, Colo. As is typical with low frequency radio reception, this low frequency signal is usually stronger during the evening hours after the sun has set and before the morning sunrise.

Initial synchronization of the time in the internal clock 118 to the time code within the WWVB signal typically takes at a couple of minutes, or longer. This is because it takes about one minute to transmit the time code in the signal. Rarely will the RFID device 14 be initially powered up to coincide with the beginning of a new time code transmission. Thus, the RFID device 14 needs to wait for the next complete time code. Signal reception conditions may also affect how quickly the receiving circuit 114 can decode and update the received time in the internal clock 118. When synchronization occurs, the time in the internal clock 118 is accurate to within a fraction of a second. Thereafter, the RFID device 14 may seek to decode the WWVB signal only once to a few times per day to confirm that it is still on the correct time, or to correct the time resident in the internal clock 118, if necessary.

The antenna 112 can be tuned to receive LORAN-C time signals. In general, LORAN (LOng RAnge Navigation) is a terrestrial navigation system using low frequency radio transmitters that use the time interval between radio signals received from three or more stations to determine the position of a ship or aircraft and a particular time and date. The current version of LORAN in common use is LORAN-C, which operates in the low frequency portion of the electromagnetic spectrum from 90 to 110 kHz. Many nations use LORAN-C signals, including the United States, Japan, and several European countries. Russia uses a nearly identical system in the same frequency range, called CHAYKA.

The transmission times of LORAN-C pulses are precisely controlled relative to the ensemble of atomic frequency standards maintained by the United States Naval Observatory (USNO) in Washington, D.C. This network of USNO clocks is in turn compared with those of other international timekeeping laboratories such as the Bureau International des Poids et Mesures (BIPM) in Paris, France and NIST in Boulder, Colo. Using this global approach to clock inter-comparison, along with sophisticated clock weighting algorithms, these and other laboratories contribute to the existence and maintenance of Universal Coordinated Time (UTC).

Based on the precise transmission times of the LORAN-C pulses along with the ability of LORAN-C receivers to accurately track the correct cycle, transfer of Universal Coordinated Time (UTC) to the internal clock 118 is made possible.

A Global Positioning System (GPS) receiver may be incorporated into the RFID device 14. The GPS clock combines time estimates from multiple satellite atomic clocks with error estimates maintained by a network of ground stations. More specifically, the GPS receiver receives a RF time-code signal from a Global Navigation Satellite System (GNSS). In general, GNSS refers to satellite navigation systems that provide autonomous geo-spatial positioning with global coverage. A GNSS enables small electronic receivers to determine their location (longitude, latitude, and altitude) to within a few meters using time signals transmitted along a line of sight by radio from satellites.

Figure 3:
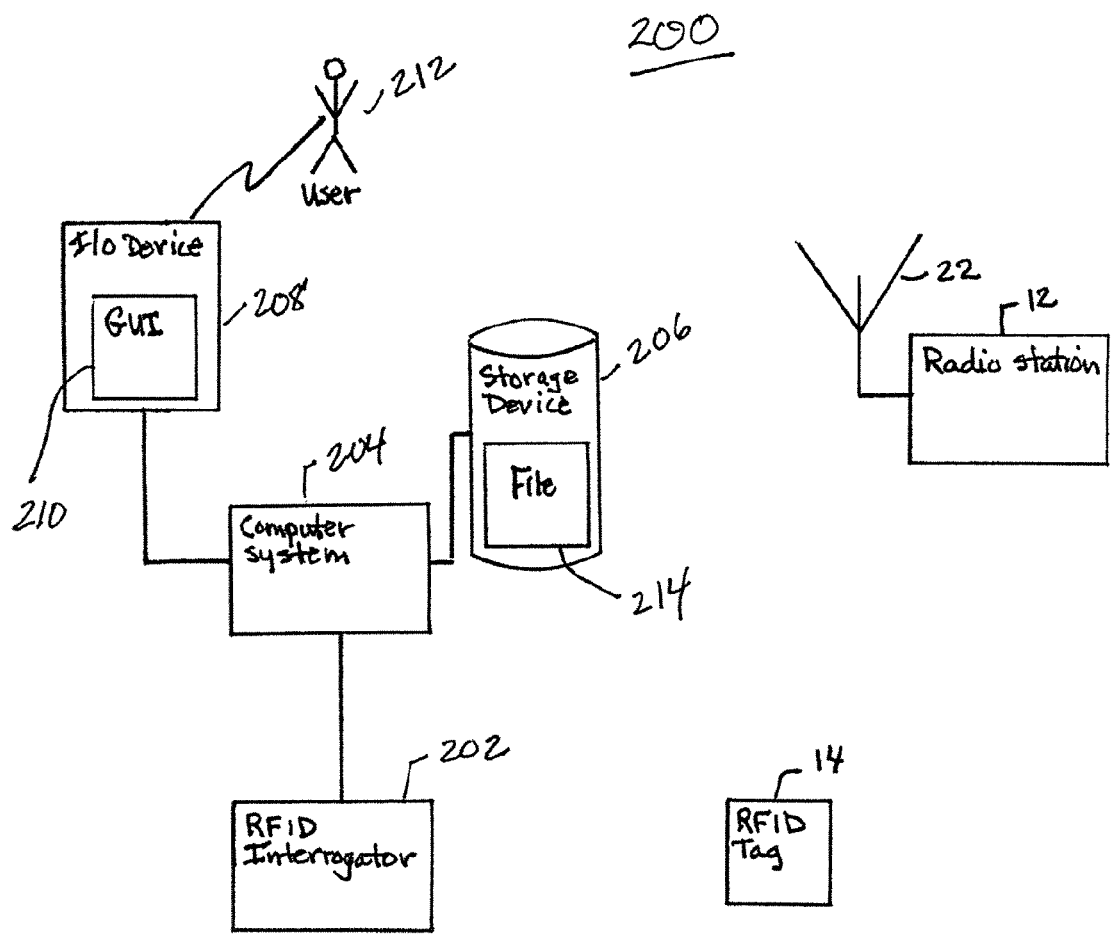
FIG. 3 is a block diagram of an exemplary RFID system.

As shown in FIG. 3, a radio frequency identification (RFID) system 200 includes the RFID device 14. The antenna of the RFID device 14 is tuned to receive a RF time-code signal from the NIST radio station WWVB 12, convert the RF time-code signal into a digital time code, decode the digital time code and update its internal clock.

System 200 includes a RFID interrogator 202 linked to a computer system 204. The computer system 204 includes a storage device 206 and an input/output (I/O) device 208. The I/O device 208 can include a graphical user interface (GUI) for display to a user 212.

Periodically, the RFID interrogator 202 interrogates the RFID device 14 and receives, for example, a unique identification and time stamp. The identification and time stamp for each interrogation can be sent to the computer system 204, which, in one example, may store the identification and time stamp in a file 214 on the storage device 206. In another example, the identification and time stamp are stored in a memory of the computer system 204. The user 212 may retrieve the stored identification(s) and time stamp(s) from the memory or file 214 and use the data for further processing or reporting.

Figure 4:
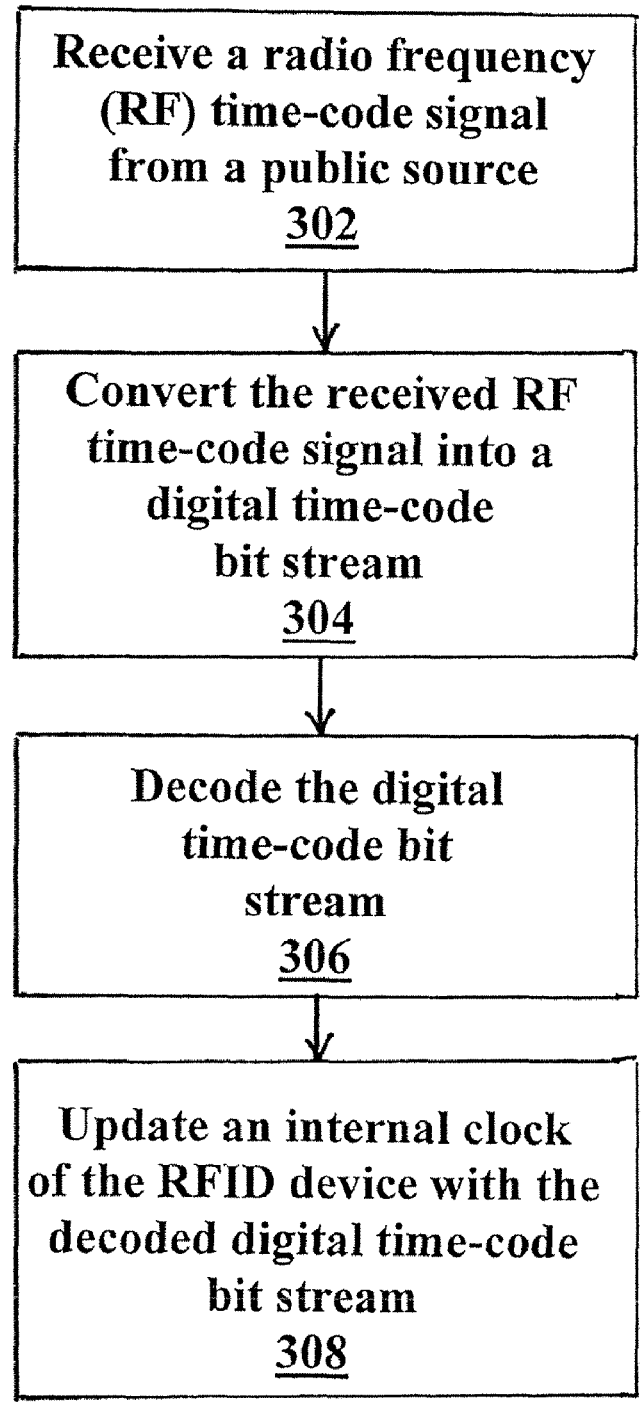
FIG. 4 is a flow diagram.
Like reference numbers and designations in the various drawings indicate like elements.

As shown in FIG. 4, a process 300 includes, in a radio frequency identification (RFID) device, receiving (302) a radio frequency (RF) time-code signal from a public source. The public source can be a terrestial source, such as LORAN (LOng RAnge Navigation), a radio network like National institute of Standards and Technology (NIST) radio station WWVB, or a Global Positioning System (GPS) source.

Process 300 converts (304) the received RF time-code signal into a digital time-code bit stream.

Process 300 decodes (306) the digital time-code bit stream.

Process 300 updates (308) an internal clock of the RFID device with the decoded digital time-code bit stream.

RFID devices described above include antenna/circuitry tuned to pick up GPS clock singles or other RF-based clock signals (e.g., NIST broadcasts, radio stations, and so forth) to obtain the current date/time information.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A radio frequency identification (RFID) device comprising:
an antenna tuned to receive a radio frequency (RF) time-code signal from a public source;
a receiving circuit linked to the antenna, wherein the receiving circuit is configured to convert the received RF time-code signal into a digital time-code bit stream;
a controller circuit linked to the receiving circuit, wherein the controller circuit is configured to decode the digital time-code bit stream;
an internal clock linked to the controller circuit, wherein a time maintained by the internal clock is updated based on the decoded time-code bit stream received from the controller circuit;

a microcontroller linked to the receiving circuit;
a memory linked to the microcontroller; and
a battery linked to and powering the receiving circuit, controller circuit, internal clock, microcontroller and memory.

2. The RFID device of claim 1 wherein the public source is a National institute of Standards and Technology (NIST) radio station WWVB.

3. The RFID device of claim 1 wherein the public source is a Global Positioning System (GPS) source.

4. A radio frequency identification (RFID) device comprising:
   a Global Positioning System (GPS) receiver configured to receive a radio frequency (RF) time-code signal from a Global Navigation Satellite System (GNSS), wherein the GPS receiver is configured to convert the received RF time-code signal into a digital time-code bit stream;
   a controller circuit linked to the GPS receiver, wherein the controller circuit is configured to decode the digital time-code bit stream;
   an internal clock linked to the controller circuit, wherein a time maintained by the internal clock is updated based on the decoded time-code bit stream received from the controller circuit;
   a microcontroller linked to the receiving circuit;
   a memory linked to the microcontroller; and
   a battery linked to and powering the GPS circuit, controller circuit, internal clock, microcontroller and memory.

5. A radio frequency identification (RFID) device comprising:
   a LORAN-C receiver configured to receive a radio frequency (RF) time-code signal, wherein the LORAN-C receiver is configured to convert the received RF time-code signal into a digital time-code bit stream;
   a controller circuit linked to the LORAN-C receiver, wherein the controller circuit is configured to decode the digital time-code bit stream;
   an internal clock linked to the controller circuit, wherein a time maintained by the internal clock is updated based on the decoded time-bit stream received from the controller circuit;
   a microcontroller linked to the receiving circuit;
   a memory linked to the microcontroller; and
   a battery linked to and powering the LORAN-C circuit, controller circuit, internal clock, microcontroller and memory.

6. A radio frequency identification (RFID) device comprising:
   an antenna tuned to receive a radio frequency (RF) time-code signal from a public source;
   a receiving circuit linked to the antenna, wherein the receiving circuit is configured to convert the received RF time-code signal into a digital time-code bit stream;
   a controller circuit linked to the receiving circuit, wherein the controller circuit is configured to decode the digital time-code bit stream;
   an internal clock linked to the controller circuit, wherein a time maintained by the internal clock is updated based on the decoded time-code bit stream received from the controller circuit;
   a microcontroller linked to the receiving circuit; and
   a memory linked to the microcontroller.

7. The RFID device of claim 6 wherein the public source is a National institute of Standards and Technology (NIST) radio station WWVB.

8. The RFID device of claim 6 wherein the public source is a terrestrial radio clock source.

9. The RFID device of claim 6 wherein the public source is a Global Positioning System (GPS) source.

10. A method comprising:
    in a radio frequency identification (RFID) device, receiving a radio frequency (RF) time-code signal from a public source;
    converting the received RF time-code signal into a digital time-code bit stream;
    decoding the digital time-code bit stream; and
    updating a time maintained by an internal clock based on the decoded time-code bit stream.

11. The method of claim 10 wherein the public source is a National institute of Standards and Technology (NIST) radio station WWVB.

12. The method of claim 10 wherein the public source is a terrestrial source.

13. The method of claim 10 wherein the public source is a Global Positioning System (UPS) source.

14. A system comprising:
    a radio frequency identification (RFID) device comprising:
        an antenna tuned to receive a radio frequency (RF) time-code signal from a public source,
        a receiving circuit linked to the antenna, wherein the receiving circuit is configured to convert the received RF time-code signal into a digital time-code bit stream,
        a controller circuit linked to the receiving circuit, wherein the controller circuit is configured to decode the digital time-code bit stream, and
        an internal clock linked to the controller circuit, wherein a time maintained by the internal clock is updated based on the decoded time-code bit stream received from the controller circuit;
    a RFID interrogator configured to interrogate the RFID device and receive in response an RFID identification and a time stamp, wherein the time stamp corresponds to the time maintained by the internal clock; and
    a subsystem linked to the RFID interrogator, wherein the subsystem is configured to store the RFID identification and time stamp received from the RFID interrogator.

15. The system of claim 14 wherein the public source is a National institute of Standards and Technology (NIST) radio station WWVB.

16. The system of claim 14 wherein the public source is a terrestrial source.

17. The system of claim 14 wherein the public source is a Global Positioning System (GPS) source.

* * * * *